United States Patent [19]
Kim et al.

[11] Patent Number: 5,502,510
[45] Date of Patent: Mar. 26, 1996

[54] METHOD FOR TEMPORAL FILTERING OF VIDEO SIGNALS USING A MOTION ADAPTIVE SPATIAL FILTER

[75] Inventors: Jong-Hoon Kim, Seoul; Seong-Dae Kim, Daejeon, both of Rep. of Korea

[73] Assignee: Daewoo Electronics Co., Ltd., Seoul, Rep. of Korea

[21] Appl. No.: 308,238

[22] Filed: Sep. 19, 1994

[30] Foreign Application Priority Data

Sep. 17, 1993 [KR] Rep. of Korea .................. 93-18870

[51] Int. Cl.[6] ................................................. H04N 7/13
[52] U.S. Cl. ........................ 348/701; 348/402; 348/416
[58] Field of Search ................................. 348/699–701, 348/402, 431, 416, 407; H04N 7/12, 7/13

[56] References Cited

U.S. PATENT DOCUMENTS

| 4,926,259 | 5/1990 | Billard et al. | 348/701 |
| 5,111,511 | 5/1992 | Ishii et al. | 348/699 X |
| 5,227,880 | 7/1993 | Kim | 348/700 |
| 5,386,249 | 1/1995 | Strolle et al. | 348/701 |

*Primary Examiner*—Victor R. Kostak
*Attorney, Agent, or Firm*—Anderson Kill Olick & Oshinsky

[57] ABSTRACT

A motion adaptive spatial filtering method is employed as a prefilter in an image coding apparatus, which processes the temporal band-limitation of a video signal without temporal aliasing by using a spatial filter having a band-limitation characteristic according to a desired temporal cutoff frequency.

2 Claims, 6 Drawing Sheets

METHOD FOR TEMPORAL FILTERING OF VIDEO SIGNALS USING A MOTION ADAPTIVE SPATIAL FILTER

FIELD OF THE INVENTION

The present invention is directed to a method for the temporal filtering of video signals; and, in particular, to a motion adaptive spatial filtering method for use in an image coding apparatus, capable of achieving a temporal band limitation without incurring temporal aliasing effects and thereby obtaining an improved picture quality.

DESCRIPTION OF THE PRIOR ART

In digital television systems such as video-telephone, teleconference and high definition television systems, an image coding apparatus has been used to reduce a large volume of data defining each frame of video signals by way of employing various data compression techniques, for example, a transform coding using a Discrete Cosine Transform, and a motion compensation coding for reducing the temporal relationship between two successive frames.

In order to effectively carry out the data compression process, most real-time image coding apparatus available in the art employ various filters as a part of a front-end processing for the filtering and frame rate reduction. These filters serve to eliminate or alleviate temporal noises and perform band limitation to thereby improve the picture quality and coding efficiency.

One of such prior art apparatus is disclosed in an article by Eric Dubois et al., "Noise Reduction in Image Sequences Using Motion-Compensated Temporal Filtering", IEEE Transactions on Communications, COM-32, No. 7 (July, 1984), which utilizes a nonlinear recursive temporal filter to reduce noise components which may arise in an initial signal generation and handling operation. This temporal filter employs a motion compensation technique to perform the filtering in the temporal domain along the trajectory of a motion to thereby reduce noise components in moving areas without modifying the details of an image.

Another prior art apparatus is described in an article by Wen-Hsiung Chen et al., "Recursive Temporal Filtering and Frame Rate Reduction for Image Coding", IEEE Journal on Selected Areas in Communications, SAC-5 (August, 1987), which also employs a recursive temporal filter to perform a recursive filtering and frame rate reduction. This filter when applied in the temporal domain can smooth out frame-to-frame input noises and improve the picture quality.

U.S. Pat. No. 4,694,342 issued to K. J. Klees provides an apparatus which utilizes a spatial filter that can function both recursively and non-recursively for removing noises from a video image while substantially preserving the details thereof. This filter includes a lookup table for storing predefined and filtered output pixel values and predefined feedback pixel values wherein certain portions of an incoming image are filtered non-recursively to substantially preserve the image details while certain other portions of the same image are filtered recursively to remove noises therefrom.

While the above and other prior art apparatus may be capable of reducing the noises in moving areas without altering the image details through the use of a lowpass filtering technique performed along the trajectory of a motion, such approaches tend to introduce artifacts in those areas where the motion occurs in a relatively high speed. As a result, such apparatus are not equipped to adequately deal with the temporal band limitation or the visual artifacts resulting from temporal aliasing.

If the successive spectra include the aliasing components, visual artifacts appear in the image. Especially, those moving areas comprised of high spatial frequency components may distort psychovisual effects: for instance, the perceived velocity on moving areas may differ from the actual velocity. To achieve an efficient temporal band-limitation, therefore, it is desirable to have a filter which is not affected by the aliasing effect.

Further, in order to carry out a temporal domain filtering on pixels located along a temporal axis to limit the temporal bandwidth, a great deal of frame delays and memories are required, which may become an obstacle to implementing an image coding apparatus.

SUMMARY OF THE INVENTION

It is, therefore, a primary object of the present invention to provide a motion adaptive spatial filtering method that can be used as a prefilter in an image coding apparatus, capable of effectively performing temporal band-limitation of video signals without incurring temporal aliasing and capable of reducing the requirements for the frame delay and large memory capacity.

In accordance with the present invention, there is provided a method for filtering a video signal with a predetermined temporal cutoff frequency to achieve a temporal band-limitation thereof, comprising the steps of:

(i) determining a motion vector which represents the motion for a current pixel;

(ii) calculating a spatial filter impulse response in the frequency domain based on the determined motion vector and the temporal cutoff frequency;

(iii) determining an impulse response in the spatial domain based on the spatial filter impulse response in the frequency domain, thereby performing a filtering operation on the current pixel in the video signal; and (iv) repeating steps (i) to (iii) until all of the pixels in the video signal are processed.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

A video signal may be treated in terms of its 3dimensional, i.e., horizontal, vertical and temporal components; and described as a continuous function $f_3(x,y,t)$. Assuming that its moving objects have only a constant-velocity rigid translational motion $v=(v_x,v_y)$, the Fourier transform of the continuous video signal, $F_3(\cdot)$, may be represented as follows:

$$F_3(f_x,f_y,f_t)=F_2(f_x,f_y)\cdot\delta(f_xv_x+f_yv_y+f_t) \quad \text{Eq. (1)}$$

wherein $F_2(f_x, f_y)$ is the Fourier transform of a 2-dimensional video signal $f_2(x,y)$, and $\delta(f_xv_x+f_yv_y+f_t)$ represents a tilted plane in a 3-dimensional frequency space described by the equation $f_xv_x+f_yv_y+f_t=0$ so that the baseband exists only on a 2-dimensional frequency plane. Eq. (1) is disclosed in, e.g., an article by R. A. F. Belfor, et al., "Motion Compensated Subsampling of HDTV", SPIE, 1605, Visual Communications and Image Processing '91, pp. 274–284 (1991). From the location of a baseband spectrum, a spatio-temporal bandwidth can be anticipated. That is, if a temporal bandwidth $f_t^w$ is given the relationship among the temporal bandwidth $f_t^w$ the spatial bandwidth $f_x^w$ and $f_y^w$, and the velocity components $v_x$ and $v_y$ is obtained from Eq. (1) as follows:

$$f_t^w = f_x^w \cdot v_x + f_y^w \cdot v_y \quad \text{Eq. (2)}$$

wherein $f_x^w$ and $f_y^w$ are the respective spatial bandwidth components in x and y directions. From Eq. (2), it can be seen that the temporal bandwidth is proportional to the velocity of the moving objects; and when the temporal bandwidth is fixed, the spatial bandwidth becomes inversely proportional to the velocity of the moving object.

Since the video signal is sampled with spatial and temporal sampling frequencies, the sampled video signal is represented as 3-dimensional sampled data or pixels. Therefore, sampling of the continuous function $f_3(\cdot)$ may be expressed by multiplying the continuous function $f_3(x,y,t)$ with a 3-dimensional array of delta functions. A spectrum distribution of the pixels may be then given by the convolution of Fourier transform of $f_3(\cdot)$ and a delta function. As a result, the spectrum of the pixels is replicated at intervals of the sampling frequencies by the characteristics of the delta function.

Figure 1A:
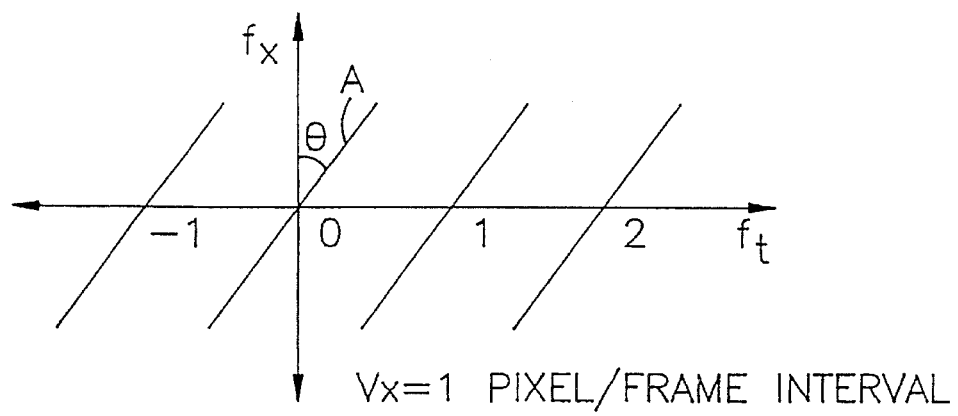
FIGS. 1A, 1B and 1C are diagrams illustrating base-band spectrum distributions as a function of the velocity of a moving object.
Figure 1B:
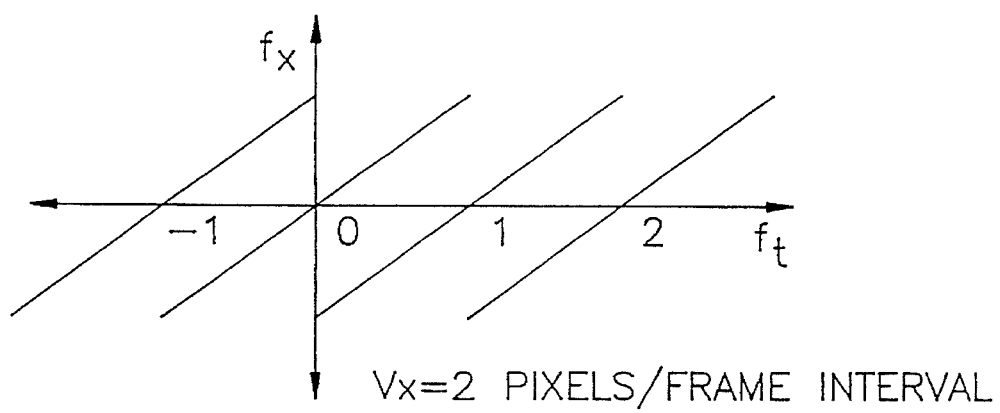
Figure 1C:
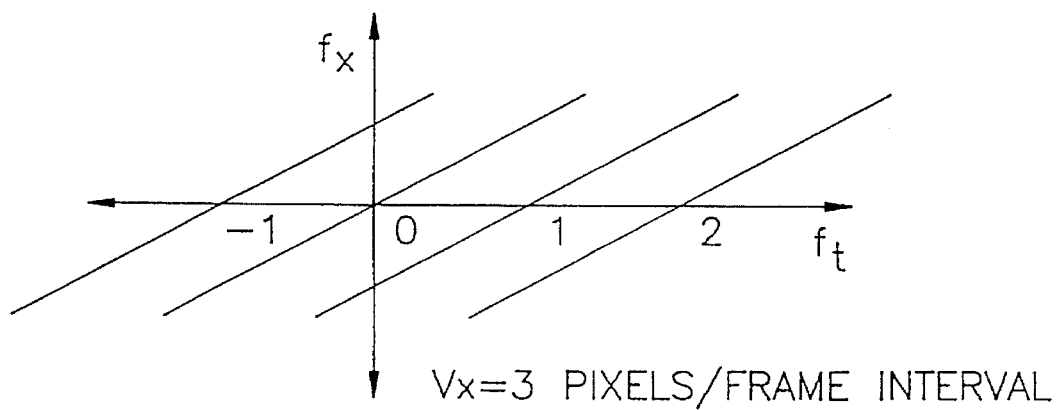

Referring first to FIGS. 1A, 1B, and 1C, there are shown baseband spectrum distributions as a function of the velocity of a moving object $v_x=1$ pixel/frame interval, $v_x=2$ pixels/frame interval and $v_x=3$ pixels/frame interval, wherein solid lines indicate the replicas of a baseband; and the temporal sampling frequency is normalized to 1; and the spatial (x axis direction) and temporal frequencies are designated as $f_x$ and $f_t$, respectively.

The motion of a pixel A in the moving object causes the spectrum to become skewed from the spatial frequency axis as shown in FIG. 1A. As shown in FIGS. 1A, 1B and 1C, the angle $\Theta$ of said skewing increases as does the velocity. From Eq. (2), the reason for the skewing can be readily understood by considering the temporal frequency at a pixel in the video signal: since the spectrum distribution on the spatio-temporal frequency domain is related to the product of the spatial frequency and the speed of the moving object, a higher velocity of the moving object gives rise to a higher temporal frequency. It should be stressed that the spectrum is skewed and not rotated.

Consequently, as shown in FIGS. 1A, 1B and 1C, the aliasing appears when the velocity of the moving object is increased. For the purpose of illustration, 1 pixel/frame interval is assumed to be the critical velocity not creating the aliasing as shown in FIG. 1A. If the repeated spectra include the aliasing components, visual artifacts appear in an image. Especially, those moving areas comprised of high spatial frequency components may distort psychovisual effects, e.g., the perceived velocity on moving areas may differ from the real velocity. For an efficient temporal band-limitation, therefore, it is desirable to design a filter not affected by the aliasing.

Figure 2:
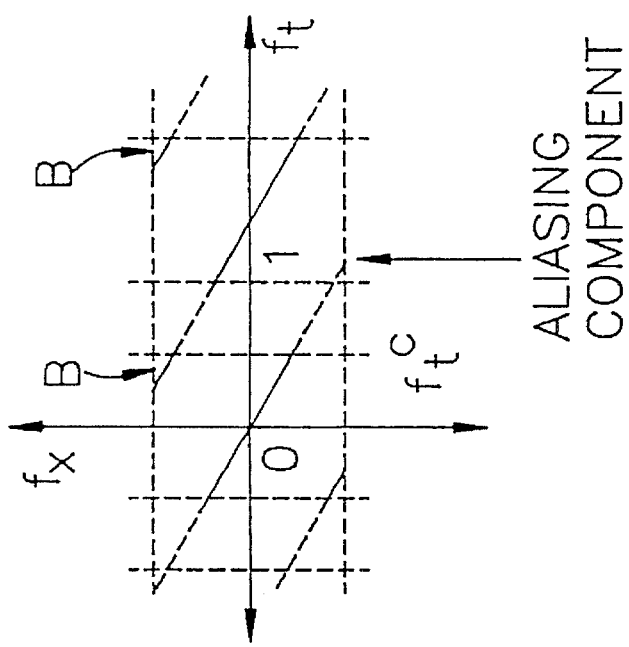
FIG. 2 is a diagram depicting the result of a conventional lowpass filtering in the temporal domain with a fixed temporal cutoff frequency.
Figure 2:
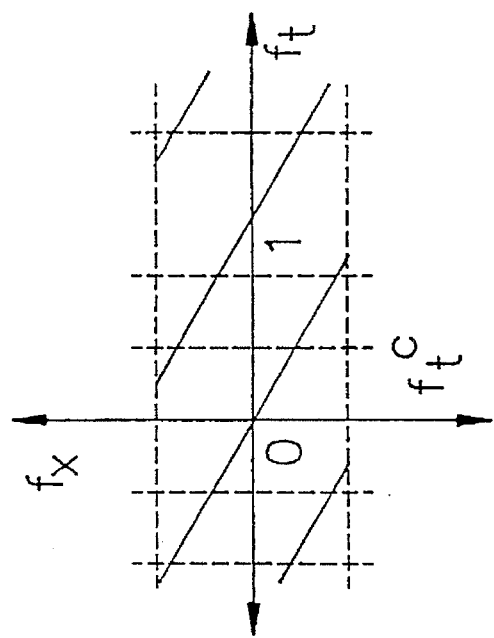

Referring to FIG. 2 results of lowpass filtering in the temporal domain with a fixed temporal cutoff frequency $f_t^c$ are illustrated. In order to perform the temporal filtering, two assumptions may be made as follows: first, baseband spectrum has no spatial aliasing components, and secondly, for the sake of simplicity, there exists only purely horizontal motion (represented in terms of $f_x$) with a constant velocity. In FIG. 2, the filtered result contains, e.g., high spatial frequency components B of adjacent spectra which represent temporal aliasing. That is, the high spatial frequency components affect the adjacent replicas. In other words, a disturbance between the adjacent replicas appears in the displayed image.

As may be seen from Eqs. (1) and (2), the relation between the spatial (including the vertical and the horizontal components) and temporal frequencies $f_s$ and $f_t$ are represented as follows:

$$f_s = \frac{1}{|v|} \cdot f_t \quad \text{Eq. (3)}$$

wherein the spatial frequency $f_s$ is defined on $f_x$-$f_y$ plane. As is seen from Eq. (3), it should be appreciated that, when the temporal cutoff frequency is fixed in order to limit the temporal bandwidth, the spatial cutoff frequency becomes inversely proportional to the absolute value of the velocity of the moving object.

Assuming that $h(\cdot)$ is an impulse response of a lowpass temporal filter and, for simplicity, there exists only a purely horizontal motion (x axis direction), then the temporal band-limited video signal $g(x,t)$ may be represented as follows:

$$g(x,t) = \int_{-\infty}^{\infty} h(\tau) \cdot f(x,t-\tau)d\tau \quad \text{Eq. (4)}$$

wherein a linear phase filter is used to reduce the effect of the group-delay of a filter response. From the assumption of constant-velocity rigid translational motion $v=(v_x, v_y)$ and purely horizontal motion, a filtering input function may be represented as follows:

$$f(x, t-\tau)=f(x+v_x\tau,t) \quad \text{Eq. (5)}$$

From Eq. (5), displacement of the moving pixel along the temporal frequency axis can be represented by its trajectory in the spatial domain at a point on the temporal axis. Thus, Eq. (4) may be rewritten as:

$$g(x,t) = \int_{-\infty}^{\infty} h(\tau) \cdot f(x+v_x\tau,t)d\tau \quad \text{Eq. (6)}$$

Its Fourier transform may be expressed as $$G(f_x, f_t) = F\left\{ \int_{-\infty}^{\infty} h(\tau) \cdot f(x + v_x\tau, t) d\tau \right\} \quad \text{Eq. (7)}$$

$$= F\left\{ \int_{-\infty}^{\infty} h\left(\frac{z}{v_x}\right) \cdot \frac{1}{|v_x|} \cdot f(x+z, t) dz \right\}$$

$$= H(f_x v_x) \cdot F(f_x, f_t)$$

wherein F denotes the Fourier transform descriptor. As may be seen from Eqs. (5) and (7), although the filter impulse response H(·) in the temporal frequency domain initially has a predetermined temporal cutoff frequency, it varies with the conversion of the filtering domain. That is, the filter impulse response H(·) has a spatial cutoff frequency corresponding to the predetermined temporal cutoff frequency; and the spatial cutoff frequency changes with the velocity of moving objects to preserve the predetermined temporal band-limiting characteristic. Therefore, the temporal band-limitation can be achieved by the motion adaptive spatial filtering of Eq. (6).

Figure 3:
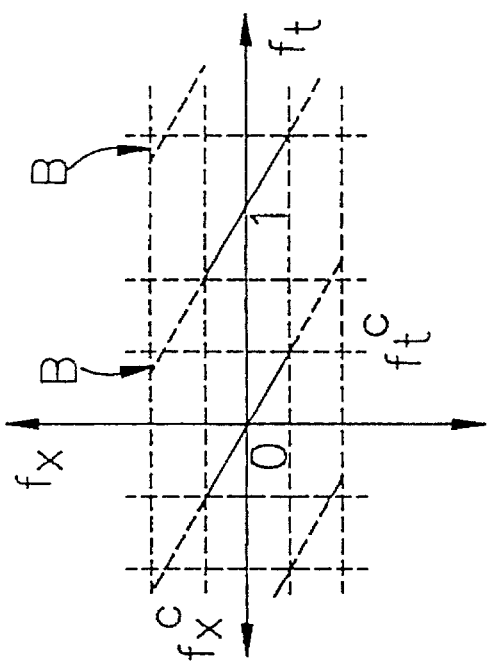
FIG. 3 is a diagram describing the result of the motion adaptive spatial filtering in accordance with the present invention.
Figure 3:
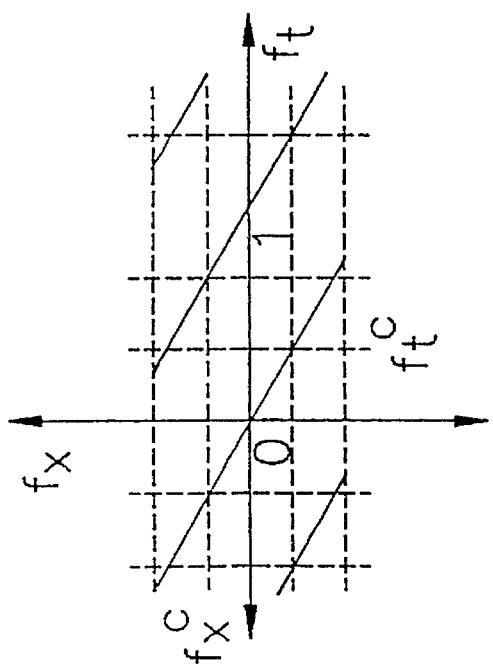

Referring now to FIG. 3, there is shown the result of the temporal band-limitation implemented in the spatial domain through the use of the inventive motion adaptive spatial filtering method. For the purpose of illustration, only the temporal frequency $f_t$ and the spatial frequency $f_x$ are considered. Although the filtering operation is performed with the spatial cutoff frequency $f_x^c$ adaptive to the motion vector, the temporal band limitation by the temporal cutoff frequency $f_t^c$ can be achieved.

Comparing with the temporal band limitation performed on the temporal domain shown in FIG. 2, it should be readily appreciated that the resultant temporal band-limitation is not affected by temporal aliasing components(de-aliasing characteristics).

For a real video signal, a vertical motion should be considered. Therefore, Eqs. (4), (6) and (7) can be rewritten as $$g(x,y,t) = \int_{-\infty}^{\infty} h(\tau) \cdot f(x,y,t-\tau) d\tau \quad \text{Eq. (8)}$$

$$g(x,y,t) = \int_{-\infty}^{\infty} h(\tau) \cdot f(x+v_x\tau, y+v_y\tau, t) d\tau \quad \text{Eq. (9)}$$

$$G(f_x, f_y, f_t) = H(f_x v_x + f_y v_y) \cdot F(f_x, f_y, f_t) \quad \text{Eq. (10)}$$

As can be seen from Eq. (10), an impulse response of the spatial filter is determined from that of the temporal filter with the desired temporal cutoff frequency. Specifically, a spatial filter impulse response $h_s(x,y)$ corresponding to a lowpass temporal filter with a cutoff frequency $f_t^c$ is determined by inverse Fourier transforming the spatial filter impulse response $H_s(f_x, f_y)$ in the frequency domain whose value is defined as $$H_s(f_x, f_y) = \begin{pmatrix} 1, -f_t^c < f_x v_x + f_y v_y < f_t^c \\ 0, \text{otherwise} \end{pmatrix} \quad \text{Eq. (11)}$$

Referring back to Eq. (1), the baseband spectrum exists only on the tilted plane in a 3-dimensional frequency space defined by the equations $f_x v_x + f_y v_y + f_t = 0$. The tilted plane is denoted as P3 in FIG. 4A. P1 and P2 represent planes defined by the equation $f_t = f_t^c$, $f_t = -f_t^c$, respectively. L1 and L2 represent intersecting lines between P1 and P3, P2 and P3, respectively. The shaded region on the plane P3 represents a portion of a baseband spectrum whose temporal frequency is smaller than the cutoff frequency $f_t^c$.

Figure 4A:
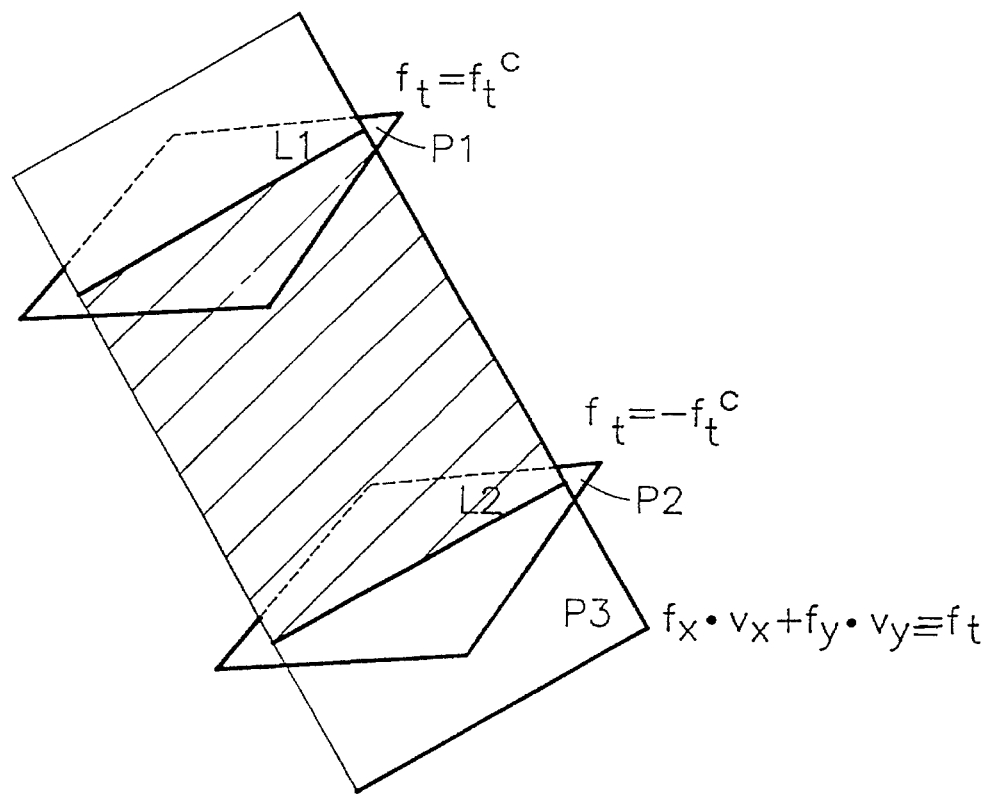
FIGS. 4A and 4B are diagrams showing an impulse response of the inventive filter in the spatial domain.
Figure 4B:
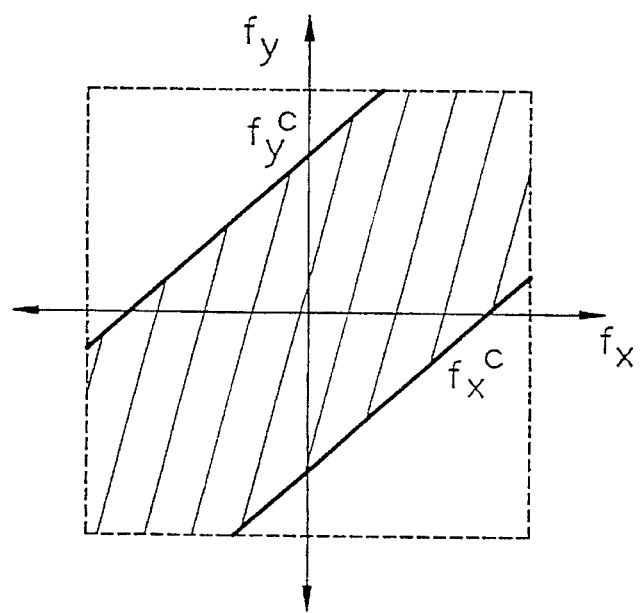

In FIG. 4B, there is shown a projection of the shaded region in FIG. 4A on a spatial frequency plane, i.e., $f_x$-$f_y$ plane. The spatial filter impulse response $H_s(f_x, f_y)$ in Eq. (11) denotes a function whose value is 1 when $f_x$ and $f_y$ are included in the shaded region. Therefore, temporal lowpass filtering with the cutoff frequency $f_t^c$ is equivalent to nullifying a portion of the baseband spectrum for the unshaded region on the spatial frequency domain. From Eq. (11) $f_x^c$ and $f_y^c$ in FIG. 4B are determined as follows:

$$f_x^c = \frac{f_t^c}{v_x} \quad \text{Eq. (12)}$$

$$f_y^c = \frac{f_t^c}{v_y}$$

A continuous description of the motion adaptive spatial filtering has been presented above. However, similar results hold true for the discrete case. Eq. (8) is then given by $$g(l,m,n) = \sum_{k=-N}^{N} h(k) \cdot f(l,m,n-k) \quad \text{Eq. (13)}$$

wherein n denotes a frame number; h denotes filter coefficients of a lowpass temporal filter with a length of 2N+1(N is a positive integer); and l and m denote horizontal and vertical positions of a pixel. The corresponding spatial filtering is then given by $$g(l,m,n) = \sum_{k1=-L}^{L} \sum_{k2=-M}^{M} h_s(k1,k2) \cdot f(l-k1, m-k2, n) \quad \text{Eq. (14)}$$

wherein $h_s$ denotes filter coefficients of the 2-dimensional spatial filter with a size of (2L+1)×(2M+1). The filtering coefficients $h_s$ can be calculated by inverse transforming the spatial filter impulse response $H_s$ which is determined by the impulse response of the temporal lowpass filter.

As described above, it should be appreciated that the filtering operation is performed in the spatial domain based on the motion of each pixel to thereby achieve a temporal band limitation. Therefore, the temporal aliasing, occurring in the repeated spectra when the velocity of the moving objects is increased, may be effectively eliminated by the inventive filter to thereby greatly reduce the visual artifacts appearing in the moving areas within an image.

Figure 5:
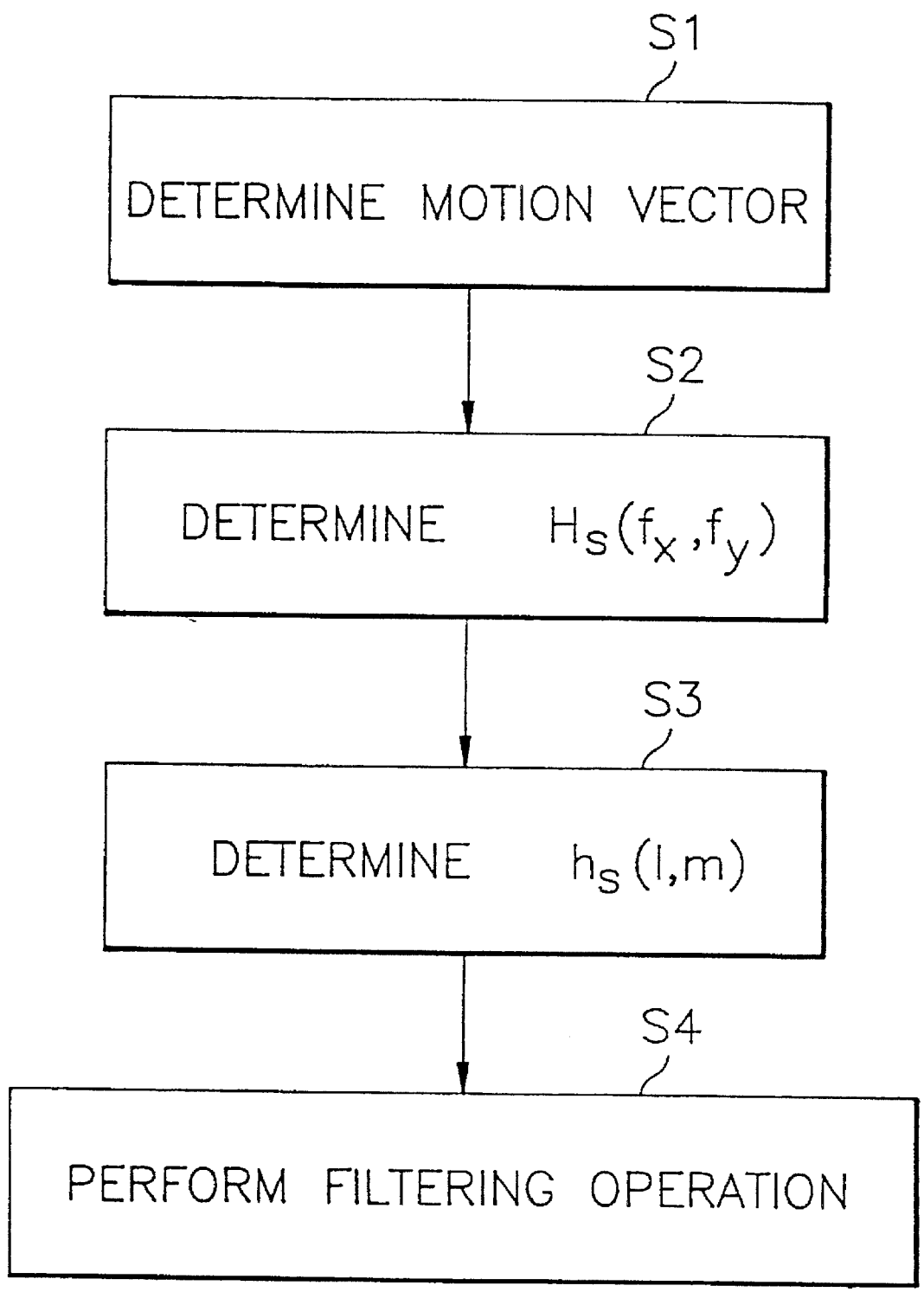
FIG. 5 is a flow chart explaining the motion adaptive spatial filtering method of the present invention.

Referring to FIG. 5, there is shown a flow chart summarizing the inventive filtering procedure for a current pixel in a current frame of video signal.

In step S1, a motion vector representing a motion for a current pixel in a video signal is determined. A spatial filter impulse response $H_s(f_x, f_y)$ in the frequency domain is determined in accordance with Eq. (11) in step S2.

In step S3, $h_s(l, m)$ is determined from an inverse Fourier transform of $H_s(f_x, f_y)$. Finally, a filtered result for the current pixel is determined by Eq. (14) in step S4. Said steps S1 to S4 are repeated for all the pixels in the video signal to thereby obtain a filtered video signal. The filter impulse responses may be predetermined and stored according to a set of predetermined candidate motion vectors, wherein each of the filter impulse response includes (2L+1)×(2M+1) filter coefficients. In that case, instead of steps S2 and S3, the spatial filter $h_s(l, m)$ is to be selected only according to the motion vector determined in step S1.

Figure 6:
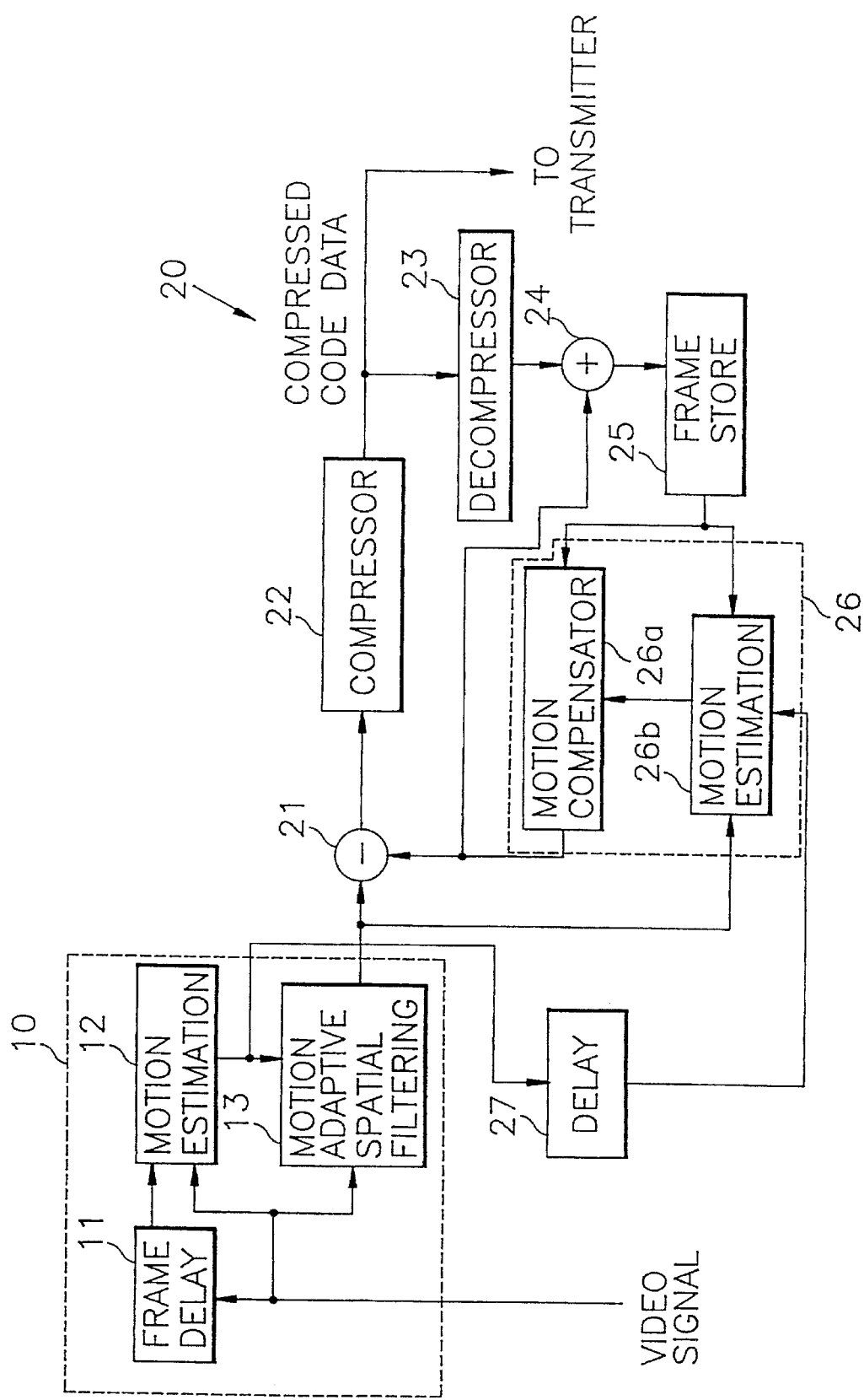
FIG. 6 is a schematic block diagram representing an image coding apparatus employing the motion adaptive spatial filtering method in accordance with a preferred embodiment of the present invention.

Referring now to FIG. 6, there is shown an image coding apparatus employing the motion adaptive spatial filtering method in accordance with a preferred embodiment of the present invention. The image coding apparatus comprises a motion adaptive spatial filtering circuit 10 and an image encoder 20 for eliminating redundancies in the filtered video signal in order to compress these video signals to a more manageable size for the transmission thereof. The video signal is generated from a video signal source, e.g., video camera(not shown), and fed to the motion adaptive spatial filtering circuit 10.

The motion adaptive spatial filtering circuit 10 performs the filtering operation, as previously described, in accordance with Eq. (14). The motion adaptive spatial filtering circuit 10 includes a frame delay block 11, a motion estimation block 12 and a motion adaptive spatial filtering-(MASF) block 13. The frame delay block 11 has a frame buffer memory in which a video signal is delayed by one frame interval. The delayed video signal is coupled to the motion estimation block 12 as a previous frame of the video signal.

The motion estimation block 12, as well known in the art, receives the previous frame from the frame delay block 11 and a current frame of the video signal directly from the video source and extracts motion vectors associated with each of the pixels included in the current frame. The extracted motion vectors are sequentially coupled to the MASF block 13 and to the image encoder 20. In order to extract a motion vector associated with each of the pixels, various motion estimators, as well known in the art, may be employed. For instance, the motion estimator disclosed in an article published by Simulation Model Education Group, MPEG (Moving Picture Experts Group) Video Simulation Model Three(SM3), ISO/IEC JTC1/SC2/WG11, MPEG 90/041 (July 1990) may be advantageously utilized.

The MASF block 13 receives the current frame of the video signal from the source and the extracted motion vectors from the motion estimation block 12, and serves to filter the current frame on a spatial domain as described above. The MSAF block 13 may include a lookup table which has a plurality of groups of filter coefficients, each of which is predetermined according to a plurality of candidate motion vectors.

The filtered current frame of video signal from the MASF block 13 is coupled to the image encoder 20 which serves to eliminate redundancies in the filtered video signal in order to compress the video signal to a more manageable size suitable for the transmission thereof. The image encoder 20, in accordance with a preferred embodiment of the present invention, includes a compressor 22, a decompressor 23 and a motion compensation block 26. The compressor 22, as is well known in the art, employs a Discrete Cosine Transform ("DCT") circuit and a quantization circuit which are described in an article by Chen and Pratt, "Scene Adaptive Coder", IEEE Transactions on Communications, Vol. COM-32, No.3(March 1984), while the decompressor 23 employs an inverse quantization circuit and an inverse DCT circuit.

A predicted video signal is extracted from a previous frame stored in a frame store block 25 through the use of a motion compensation block 26 and then coupled to a subtraction circuit 21 which generates a differential signal between the filtered current frame and the predicted video signal. The differential signal is quantized and encoded by the compressor 22 to generate coded data. The coded data is then applied to a transmitter for the transmission thereof, and also coupled to the decompressor 23 where the digital data is converted back to the differential signal. The differential signal is then coupled to an adder circuit 24 where it is combined with the predicted video signal, thereby providing a reconstructed current frame of video signal. The previous frame is coupled through the frame store block 25 to the motion compensation block 26 to predict a subsequent frame. Therefore, the bit rate reduction is achieved by taking advantage of the fact that the differential signals are generally distributed over a small dynamic range and consequently can be represented by a smaller number of bits. The motion compensation block 26 includes a motion compensator 26a and a motion estimation block 26b for predicting the current frame from the previous frame. The motion estimation block 26b may employ a block matching algorithm which is based on a block by block processing disclosed in the MPEG Video Simulation Model Three(SM3). In the block matching algorithm, a small block called a search block is taken from the current frame and a larger block called a search region is taken from the previous frame, wherein the current frame is divided into a plurality of search blocks of an equal size and the previous frame is also divided into a corresponding number of the search regions.

Search block displacement information, indicative of the location of a block in the search region that best matches a search block, is determined by the motion estimation block 26b which inputs corresponding motion vector to the motion compensator 26a. The motion compensator 26a receives the motion vector to retrieve the predicted video signal from the frame store block 25. The predicted video signal is then coupled to the subtraction circuit 21 in order to extract the differential signal.

The motion vector extracted in the motion estimation block 12 may be coupled to the image encoder 20 via a delay block 27 which compensates for a delay of video signals incurred in the filtering process, thereby being used advantageously in determining a motion vector in the motion estimation block 26b.

While the present invention has been shown and described with reference to the particular embodiments, it will be apparent to those killed in art that many changes and modifications may be made without departing from the spirit and scope of the invention as defined in the appended claims.

What is claimed is:

1. A method for filtering a video signal having a plurality of pixels with a predetermined temporal cutoff frequency to achieve a temporal band-limitation thereof, comprising the steps of:

(b1) calculating a plurality of spatial filter impulse responses in the frequency domain based on a plurality of predetermined candidate motion vectors and the temporal cutoff frequency;

(b2) determining a plurality of impulse responses in the spatial domain based on the spatial filter impulse responses in the frequency domain;

(b3) determining one of said candidate motion vectors as a motion vector which represents the motion for a current pixel;

(b4) selecting one of said impulse responses based on the determined motion vector, thereby performing a filtering operation for the current pixel in the video signal; and (b5) repeating said steps (b3) to (b4) until all of the pixels in the video signal are processed.

2. The method of claim 1, wherein the filtered video signal $g(l, m, n)$ is represented as follows:

$$g(l,m,n) = \sum_{k1=-L}^{L} \sum_{k2=-M}^{M} h_s(k1,k2) \cdot f(l-k1, m-k2, n)$$

wherein l and m represent the position of a pixel in the video signal; n is a frame number; the impulse response $h_s(k1, k2)$ is determined by inverse Fourier transforming the spatial filter impulse response $H_s(f_x, f_x)$ in the frequency domain which is defined as $$H_s(f_x, f_y) = \begin{pmatrix} 1, & -f_t^c < f_x v_x + f_y v_y < f_t^c \\ 0, & \text{otherwise} \end{pmatrix}$$

wherein $v_x$ and $v_y$ denote a motion vector for a corresponding pixel and $f_t^c$ denotes the temporal cutoff frequency; k1 and k2 are indexes for the 2-dimensional filter $h_s(\cdot)$ whose absolute values are not greater that L and M, respectively; positive integers L and M represent the respective lengths of a 2-dimensional filter $h_s(\cdot)$.

* * * * *